United States Patent [19]

Kodaira et al.

[11] Patent Number: 5,583,709
[45] Date of Patent: Dec. 10, 1996

[54] METHOD AND APPARATUS FOR AUTOMATICALLY SELECTING A NOISE REDUCTION CIRCUITRY IN PLAYBACK MODE

[75] Inventors: Satoru Kodaira; Shirou Suzuki; Yoshinori Takei, all of Tokorozawa, Japan

[73] Assignee: Pioneer Electronic Corporation, Tokyo, Japan

[21] Appl. No.: 286,175

[22] Filed: Aug. 5, 1994

[30] Foreign Application Priority Data

Aug. 11, 1993 [JP] Japan ................................. 5-199433

[51] Int. Cl.$^6$ ........................................................ G11B 5/02
[52] U.S. Cl. ............................ 360/55; 327/558; 327/559
[58] Field of Search ................................. 330/149, 144; 333/14; 327/558, 559, 63, 64; 381/106, 103, 56; 360/55, 65; 348/620; 455/63

[56] References Cited

U.S. PATENT DOCUMENTS

| | | | |
|---|---|---|---|
| 4,242,704 | 12/1980 | Ito et al. | 348/620 |
| 4,281,295 | 7/1981 | Nishimura et al. | 333/14 |
| 4,427,950 | 1/1984 | Akagiri et al. | 330/149 |
| 4,461,025 | 7/1984 | Franklin | 381/56 |
| 4,539,526 | 9/1985 | Davis | 330/144 |
| 5,124,850 | 6/1992 | Kizu | 360/65 X |
| 5,337,368 | 8/1994 | Kikuchi et al. | 381/103 |

FOREIGN PATENT DOCUMENTS 58-56315  4/1983  Japan.

*Primary Examiner*—Aristotelis Psitos
*Assistant Examiner*—Patrick Wamsley
*Attorney, Agent, or Firm*—Keck, Mahin & Cate

[57] ABSTRACT

Method and apparatus automatically select, in a playback mode, a noise reduction circuitry of a noise reduction system by which a middle-to-high frequency signal of a low level included in a recording signal is compressed in dynamic range for recording and the compressed middle-to-high frequency signal is expanded in dynamic range in the playback mode, thereby suppressing middle to high frequency noises in the reproduction signal. A level difference ΔL between the maximum and minimum signals of the low frequency component in the reproduction signal and a level difference ΔH between the maximum and minimum signals of the middle-to-high frequency component in the reproduction signal are obtained. While comparing the magnitudes of the two level differences obtained, the selection of an appropriate noise reduction circuitry is performed so that the two level differences are made almost equal to each other.

2 Claims, 5 Drawing Sheets

WHEN EXPANSION DEGREE IN PLAYBACK MODE MATCHES WITH THE COMPRESSION DEGREE IN RECORDING MODE

WHEN EXPANSION DEGREE IN PLAYBACK MODE IS TOO STRONG

WHEN EXPANSION DEGREE IN PLAYBACK MODE IS TOO WEAK

| | | REPRODUCING MODE | | |
|---|---|---|---|---|
| | | OFF | P1 | P2 |
| RECORDING MODE | OFF | $\Delta L \fallingdotseq \Delta H$ | $\Delta L < \Delta H$ | $\Delta L \ll \Delta H$ |
| | P1 | $\Delta L > \Delta H$ | $\Delta L \fallingdotseq \Delta H$ | $\Delta L < \Delta H$ |
| | P2 | $\Delta L \gg \Delta H$ | $\Delta L > \Delta H$ | $\Delta L \fallingdotseq \Delta H$ |

: OPTIMUM POSITION

METHOD AND APPARATUS FOR
AUTOMATICALLY SELECTING A NOISE
REDUCTION CIRCUITRY IN PLAYBACK
MODE

BACKGROUND OF THE INVENTION

1. Field of the Invention

The present invention relates to a method and an apparatus for automatically selecting a noise reduction circuitry at the time of a playback operation of a recording and playback apparatus.

2. Description of Background Information

Recording and playback apparatuses using a magnetic recording medium, such as tape decks, are generally provided with a noise reduction system to reduce the medium's inherent noise, that is, the tape hiss noise. With such a noise reduction system, conventionally, the selection of a noise reduction circuitry in the playback mode (i.e. the selection of an appropriate noise reduction circuitry, from among several noise reduction circuitries, which performs an operation complementary to the operation of the noise reduction circuitry used at the time of recording) is performed manually in accordance with the record or memory of the noise reduction circuitry used at the time of the recording.

In the case of an arrangement disclosed in Japanese Utility Model Kokai No. 58-56315, on the other hand, an ID signal indicative of the kind of the noise reduction circuitry is recorded on a tape at the time of the recording operation, thereby an automatic selection of a noise reduction circuitry is enabled by reading the ID signal at the time of playing back the signal recorded on the tape.

However, in the first case where the selection of noise reduction circuitry is performed manually, it is generally necessary to write various data relating the noise reduction operation, e.g., the ON/OFF state of the noise reduction, the type of the noise reduction circuitry used in the recording mode, into the label of the tape so that the user is able to know the type of noise reduction operation when playing back the signal recorded on the tape. It is, however, troublesome to operate the apparatus appropriately in the playback mode, and moreover there is a possibility that an erroneous selection of a noise reduction circuitry is made by the user. In case of the latter example where a noise reduction circuitry is automatically selected by using the ID signal, however, the system will not be able to select a noise reduction circuitry if no ID signals are recorded on the tape. Furthermore, it is necessary to provide a special recording area to record the ID signal on the tape, and also to provide a special magnetic head to read the ID signal. This means that the scheme using an ID signal cannot be used commonly in usual tape recorders.

OBJECTS AND SUMMARY OF THE INVENTION

The present invention has been made to solve the problems mentioned above, and an object of the invention is to provide a method and apparatus for automatically selecting a noise reduction circuitry in the playback mode, which have a good applicability and by which an appropriate noise reduction circuitry is automatically selected without using a special signal such as an ID signal or the like.

To achieve the object described above, the method and apparatus according to the present invention are configured as follows.

According to the invention, there is provided a method for automatically selecting a noise reduction circuitry of a noise reduction system in a playback mode, said noise reduction system having a plurality of noise reduction circuitries by which middle-to-high frequency components at a low level included in a recording signal are compressed in dynamic range before being recorded, and in the playback mode, the compressed middle-to-high frequency components are expanded in dynamic range, thereby suppressing middle-to-high frequency noises in the reproduction signal, wherein a level difference between maximum and minimum signal levels of low frequency components in the reproduction signal and a level difference between maximum and minimum signal levels of the middle-to-high frequency components in the reproduction signal are obtained, and one of the noise reduction circuitries of the noise reduction system is selected so that the two level differences are almost equal to each other while a comparison of magnitudes of the two level differences obtained is performed.

Furthermore, according to the invention, there is provided an apparatus for automatically selecting one of a plurality of noise-reduction circuitries included in a noise reduction system having a recording mode and a playback mode, by which a middle-to-high frequency components of a low level included in a recording signal are compressed in dynamic range before being recorded, and in the playback mode, the compressed middle-to-high frequency components are expanded in dynamic range, thereby suppressing middle-to-high frequency noises in the reproduction signal, comprising: low frequency signal extracting means for extracting only low frequency components from the reproduction signal; middle-to-high frequency signal extracting means for extracting only middle-to-high frequency components from the reproduction signal; first level detecting means for detecting a level difference between maximum and minimum signal levels of the low frequency components extracted by the low frequency signal extracting means; second level detecting means for detecting a level difference between maximum and minimum signal levels of the middle-to-high frequency components extracted by the middle-to-high frequency signal extracting means; and a noise reduction circuitry selecting means for comparing magnitudes of the level difference signals which are generated by said first and second level detecting means, and for selecting one of said plurality of noise reduction circuitries of the noise reduction system by which the values of the two level difference signals becomes almost equal to each other.

DETAILED DESCRIPTION OF THE PREFERRED EMBODIMENT

Automatic selection method and apparatus according to the invention will now be described in detail with reference to the drawings hereinafter.

The principle of the invention will be first described with reference to FIGS. 1, 2, and 3.

Figure 1:
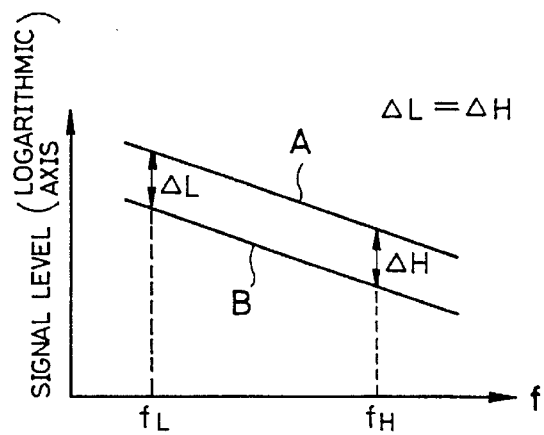
FIGS. 1, 2 and 3 are explanatory diagrams of the principle of the invention.

If a musical recording signal is separated into a high level signal and a low level signal, and a frequency spectrum is produced for each signal, both of the signals have a similar characteristic as shown in FIG. 1. In FIG. 1, the straight line A shows a frequency spectrum of the high level signal of the music signal and the straight line B shows a frequency spectrum of the low level signal in the music signal. In the case of a music signal, generally, both of the high level signal A and the low level signal B show a frequency characteristic having a coefficient of 1/f (where f represents frequency), respectively.

In a noise reduction system to suppress the noises in the middle to high frequency in the reproduction signal such as hiss noises of a magnetic tape, the low-level middle-to-high frequency signal components in the recording signal are compressed in dynamic range and recorded thereafter, and the compressed middle-to-high frequency signal components are expanded in dynamic range in the playback mode, thereby the middle-to-high frequency noises in the reproduction signal are suppressed. In such a noise reduction scheme, if the compression at the time of recording and the expansion in playback mode are matched with each other, the reproduction signal has the same frequency-amplitude characteristic as those of the original recording signal, so that the frequency spectra are also as shown in FIG. 1.

In FIG. 1, assuming that a level difference between the high level signal (shown by the straight line A) and the low level signal (shown by the straight line B) at around a low frequency $f_L$ in which the compression and expansion are not executed in the noise reduction operation is expressed by $\Delta L$ and that a level difference between the high level signal A and the low level signal B at around a middle-to-high frequency $f_H$ in which the compression and expansion are executed in the noise reduction operation is expressed by $\Delta H$, the two level differences $\Delta L$ and $\Delta H$ will have a relation that ($\Delta L \approx \Delta H$), that is, the two level differences are almost equal, in the case where the degree of the expansion in playback mode is matched with the degree of the compression at the time of recording, as will be readily understood from FIG. 1. Consequently, by determining the relationship of the magnitudes of the level differences $\Delta L$ and $\Delta H$, whether the currently selected noise reduction circuit is matched with that used in the recording mode or not can be discriminated. Briefly speaking, the present invention makes the use of the relationship of $\Delta L$ and $\Delta H$.

When considering a combination of the noise reduction circuitries used in the recording mode and the playback mode respectively in the noise reduction system mentioned above, it can be classified into the following three cases.

(1) The case where the noise reduction circuitry used in the playback mode matches the noise reduction circuitry used in the recording mode (also including the case where the noise reduction operation is turned OFF in both of the recording and playback modes):

The state of the reproduction signal in this case is as shown in FIG. 1 as mentioned above, so that a relationship of $\Delta L \approx \Delta H$ is obtained.

Figure 2:
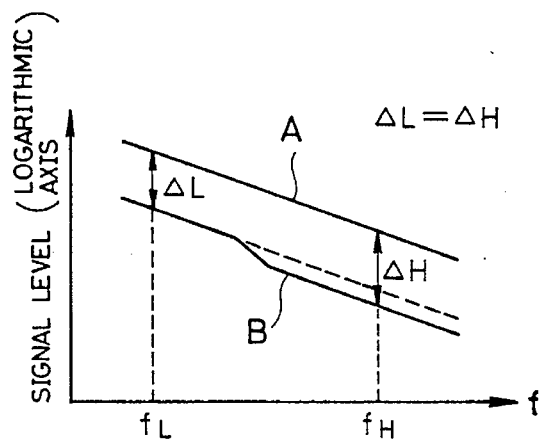

(2) The case where the degree of the expansion in playback mode is too stronger than the degree of compression at the time of recording:

The state of the reproduction signal in this case is as shown in FIG. 2, so that a relationship of $\Delta L < \Delta H$ is obtained.

Figure 3:
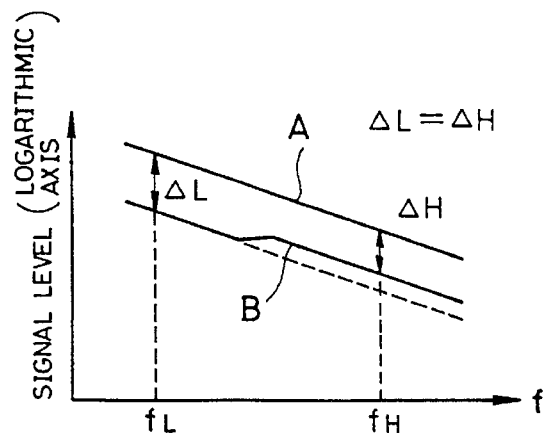

(3) The case where the degree of the expansion in playback mode is too weaker than the degree of compression at the time of recording:

The state of the reproduction signal in this case is as shown in FIG. 3, so that a relationship of $\Delta L > \Delta H$ is obtained.

In the method for automatically selecting a noise reduction circuitry according to the invention, the magnitudes of $\Delta L$ and $\Delta H$ are compared, and in the case a relationship $\Delta L < \Delta H$ or $\Delta L > \Delta H$ exists as shown in FIG. 2 or 3, switching of the noise reduction circuitry is performed until the state of $\Delta L \approx \Delta H$ in FIG. 1 is obtained. The noise reduction operations in the reproducing mode and the recording mode, consequently, can be automatically made coincident.

On the other hand, in the apparatus for automatically selecting a noise reduction circuitry according to the invention which is constructed to operate according to the principle explained above, only low frequency components are extracted from the reproduction signal by low frequency component extracting means, and are sent to first level detecting means. Further, only middle-to-high frequency components are extracted from the reproduction signal by middle-to-high frequency component extracting means, and are supplied to second level detecting means.

The first level detecting means detects the level difference $\Delta L$ between a maximum signal level and a minimum signal level of the low frequency components transmitted from the low frequency signal extracting means and sends it to the noise reduction circuitry switching means. The second level detecting means detects the level difference $\Delta H$ between a maximum signal level and a minimum signal level of the middle-to-high frequency components transmitted from the middle-to-high frequency signal extracting means and supplies it to the noise reduction circuitry switching means.

Noise reduction circuitry switching means compares the magnitudes of the level difference signals $\Delta L$ and $\Delta H$ which are respectively sent from the first level detecting means and the second level detecting means and automatically switches the noise reduction circuitry until the values of the two level difference signals become equal to each other. The noise reduction operations in the reproducing and recording modes, therefore, are automatically matched with each other.

An embodiment of the invention will now be described hereinafter with reference to the accompanying drawings.

Figure 4:
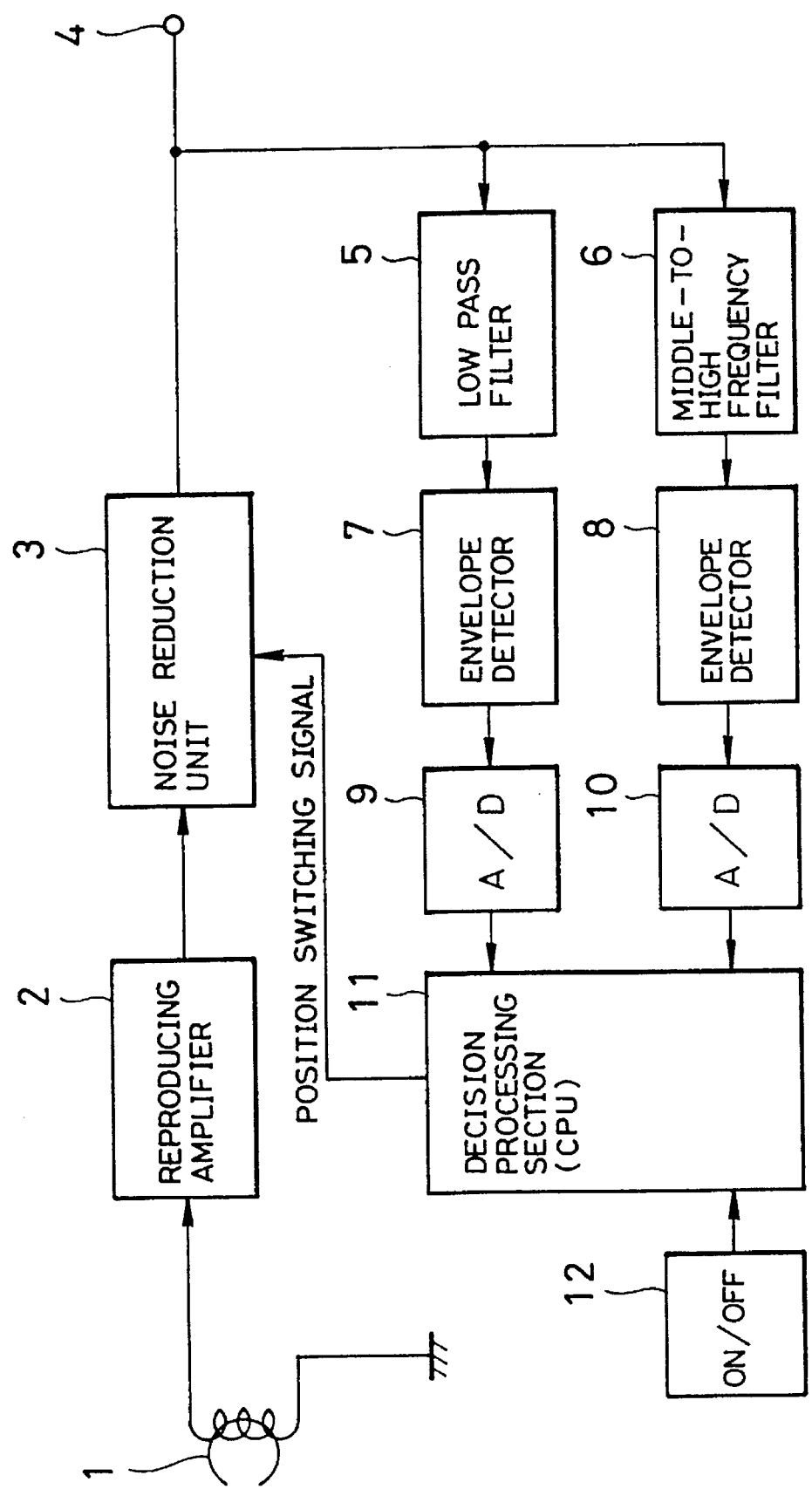
FIG. 4 is a block diagram of an embodiment of the invention.

FIG. 4 shows an embodiment of the apparatus of the invention which is constructed to perform the method of the invention. In the diagram, reference numeral 1 denotes a magnetic head; 2 denotes a playback amplifier; and 3 denotes a noise reduction unit. Although not shown, a plurality of noise reduction circuitries of different compression and expansion ratios are included in the noise reduction unit 3. The noise reduction circuitry to be used can be switched manually or by an instruction signal, that is, a position selection signal from a decision processing section 11.

A low pass filter 5 is provided for extracting only low frequency components from a reproduction signal which is outputted from the noise reduction unit 3 and for outputting the extracted components. A middle-to-high pass filter 6 is provided for extracting only middle-to-high frequency components from the reproduction signal from the noise reduction unit 3 and for outputting the extracted components.

An envelope detector 7 is provided to obtain an envelope signal of the low frequency components which is sent from the low pass filter 5. An envelope detector 8 is provided to obtain an envelope signal of the middle-to-high frequency components which are sent from the middle-to-high frequency filter 6. Reference numerals 9 and 10 denote A/D converting circuits each for converting an analog signal into a digital signal.

Figure 5:
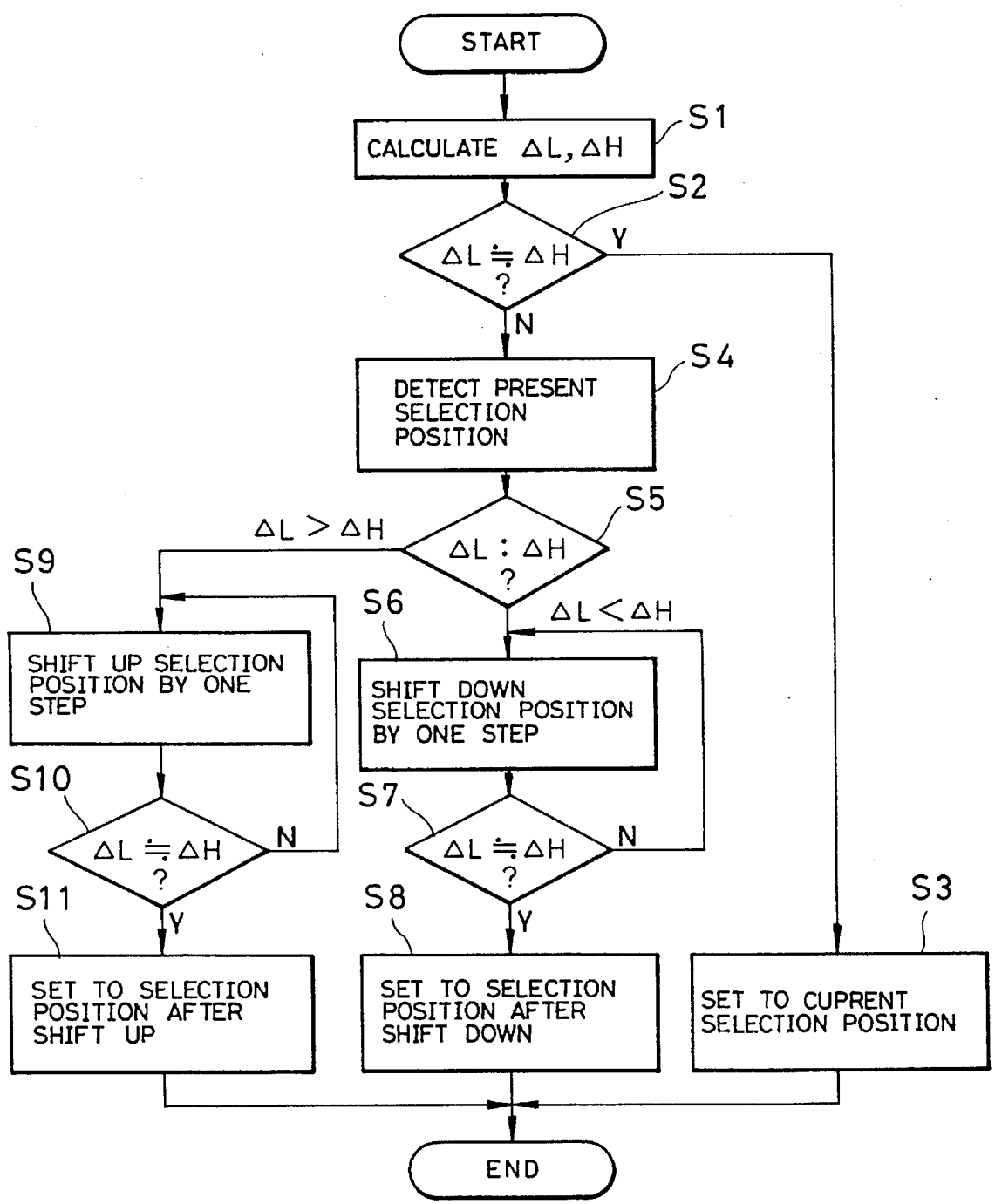
FIG. 5 is a flowchart for the operation of the embodiment.

The decision processing section 11 is a signal processing circuit comprising a CPU and peripheral circuits and executes processing operations shown in a flowchart of FIG. 5, which will be explained later, and supplies the position switching signal to the noise reduction unit 3. Thus, the decision processing section 11 automatically selects one of the noise reduction circuitries in the noise reduction unit 3 (including an OFF position where all of the noise reduction circuits are disconnected) whose noise reduction operation matches with the noise reduction operation effected to the signal recorded on the magnetic tape being played currently. Accordingly, the circuit elements of pass filter 5, envelope detector 7, A/D converting circuit 9 and decision processing section 11, constitutes a first level detecting circuit Similarly, the circuit elements of middle-to-high frequency filter 6, envelope detector 8, A/D converting circuit 10, and decision processing section 11 constitute a second level detecting circuit. Reference numeral 12 denotes an automatic selection ON/OFF key to designate whether the automatic selection of the noise reduction circuitry is executed or not.

The operation of the embodiment with the above construction will now be described with reference to a flowchart of FIG. 5. It is now assumed that the automatic selection ON/OFF key 12 has been operated to the ON side so that the automatic selection of the noise reduction circuitry is executed in the playback mode.

When the reproduction from the tape is started, a recording signal read out by the magnetic head 1 is sent to the noise reduction unit 3 through the reproducing amplifier 2. The noise reduction unit 3 effects a noise reduction operation to the signal from the reproducing amplifier 2 by using the noise reduction circuitry selected at present and supplies the processed signal to a terminal 4. The low pass filter 5 extracts the low frequency component in the reproduction signal which is supplied from the noise reduction unit 3. The low frequency component is converted into the envelope signal of the low frequency component as shown in part (A) of FIG. 6 by the envelope detector 7. The envelope signal is sent to the decision processing section 11 through the A/D converting circuit 9. The middle to high pass filter 6 extracts the middle-to-high frequency components in the reproduction signal which are supplied from the noise reduction unit 3. The extracted middle-to-high frequency component are converted into the envelope signal of the middle-to-high frequency components as shown in part (B) of FIG. 6 by the envelope detector 8. The envelope signal is sent to the decision processing circuit 11 through the A/D converting circuit 9.

Figure 6:
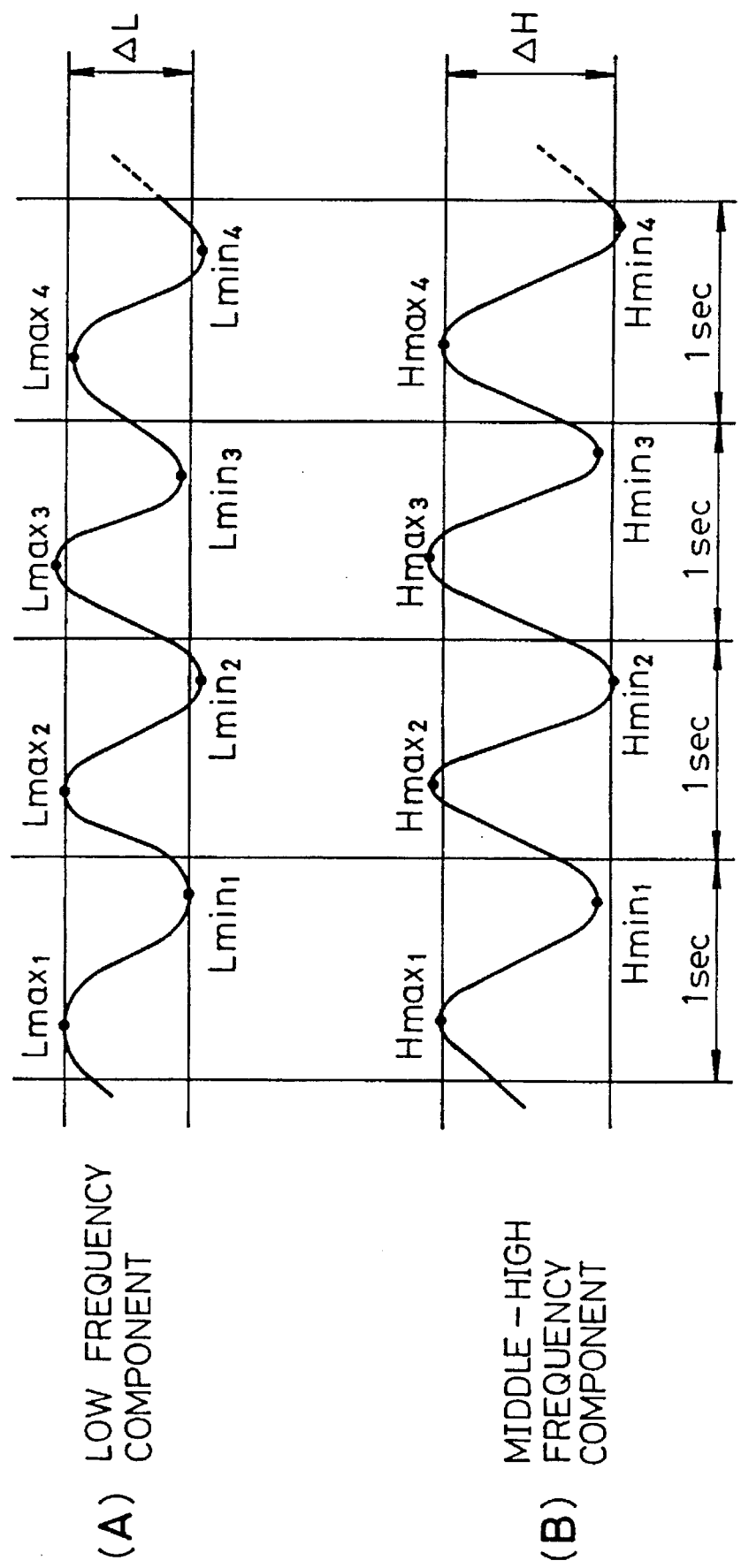
FIG. 6 is an explanatory diagram of a calculating method of level differences $\Delta L$ and $\Delta H$ used in the invention.

The decision processing section 11 receives the envelope signals shown in parts (A) and (B) of FIG. 6 and detects the maximum level $L_{max}$ and the minimum level $L_{min}$ in the envelope signal of the low frequency component and the maximum level $H_{max}$ and the minimum level $H_{min}$ in the envelope signal of the middle-to-high frequency component, respectively. To perform the above-described processes in a stable manner, the sampling operation generally is executed at regular intervals (for example, one second), the maximum and minimum levels in each interval are obtained, the mean values of the levels obtained by the sampling operations of a plurality of number of times (for instance, four times) are calculated and are determined as maximum and minimum levels of each signal.

A level difference $\Delta L = L_{max} - L_{min}$ is calculated from the maximum and minimum levels $L_{max}$ and $L_{min}$ with respect to the low frequency component obtained as mentioned above. A level difference $\Delta H = H_{max} - H_{min}$ is calculated from the maximum and minimum levels $L_{max}$ and $L_{min}$ with respect to the middle-to-high frequency component (step S1).

When the level differences $\Delta L$ and $\Delta H$ are obtained, the decision processing section 11 compares the magnitudes of $\Delta L$ and $\Delta H$ (step S2). When $\Delta L \approx \Delta H$, the decision processing section judges that the currently selected noise reduction circuitry matches with the noise reduction operation performed to the signal on the tape which is being played, so that the processing routine advances to step S3 and the present selection position is set as an optimum selection position.

On the other hand, in the case where it is judged in step S2 that the relationship $\Delta L \approx \Delta H$ is not satisfied, the processing routine advances to step S4 and which of the noise reduction circuitry of the noise reduction unit 3 is selected at present is detected. After that, a check is made in step S5 to see if $\Delta L < \Delta H$ or $\Delta L > \Delta H$.

When the relationship $\Delta L < \Delta H$ is detected in step S5, it will be understood that the present selection position is in a state in which the expansion is too strong as shown in FIG. 2. The processing routine, therefore, advances to step S6 and the selection position is switched to another noise reduction circuitry whose expansion rate is one stage lower than that of the currently selected noise reduction circuitry. The level differences $\Delta L$ and $\Delta H$ after completion of the switching are obtained in a manner similar to the case of step S1 mentioned above. A check is made in step S7 to see if $\Delta L \approx \Delta H$ or not.

When $\Delta L \approx \Delta H$ is satisfied in step S7, it is judged that the selection position after it has been switched to the noise reduction circuitry of lower expansion rate matches with the noise reduction operation effected to the signal on the tape is being played. Step S8 follows wherein the selection position after it has been switched to the lower position is set as an optimum position. When $\Delta L \approx \Delta H$ is not satisfied in step S7, the processing routine is again returned to step S6 and the selection position is further switched to a further noise reduction circuitry whose expansion rate is lower by one stage. In this manner, by switching the selection position until $\Delta L \approx \Delta H$ is obtained, a noise reduction circuitry whose expansion rate matches with the noise reduction operation effected to the signal on the tape which is currently played can be automatically selected.

On the other hand, when $\Delta L > \Delta H$ is detected in step S5, it can be said that the currently selected noise reduction circuitry has an expansion rate which is too weak, as illustrated in FIG. 3. The processing routine, therefore, advances to step S9 and the selection position is switched to a noise reduction circuitry whose expansion rage is one stage higher than that of the currently selected noise reduction circuitry. The level differences $\Delta L$ and $\Delta H$ after this switching operation are obtained in a manner similar to the case of step S1 mentioned above. Then, a check is made in step S10 to see if $\Delta L \approx \Delta H$ or not.

If it is judged in step S10 that $\Delta L \approx \Delta H$ is obtained, it is judged that the selection position after it has been switched to a noise reduction circuitry having a higher expansion rate coincides with noise reduction circuitry used in recording of the signal on the tape which is currently being played. Step S11 follows wherein the selection position after it has been switched to the noise reduction circuitry of higher expansion ratio is set as an optimum position. When $\Delta L \approx \Delta H$ is not satisfied in step S10, the processing routine is again returned to step S9 and the selection position is further switched to a noise reduction circuitry having a higher expansion rate, by one stage. In this manner, by switching the selection position until $\Delta L \approx \Delta H$ is obtained, the selection position which coincides with the noise reduction circuitry used in the recording of the signal on the tape which is currently being played can be automatically selected. Accordingly, the decision processing section 11 and noise reduction unit 3 as shown in FIG. 4 together constitute a noise reduction circuitry selecting circuit.

Figure 7:
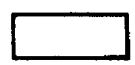
FIG. 7 is a diagram showing an example of a decision table of $\Delta L$ and $\Delta H$ in the embodiment.

FIG. 7 shows a decision table of the selection position by the above processing operation. The table of FIG. 7 is an example in the case where two noise reduction circuitries, i.e., a first noise reduction circuitry of small compression and expansion ratios and a second noise reduction circuitry of large compression and expansion rates are included in the noise reduction unit 3. The first noise reduction circuitry is used when a selection position P1 is selected, the second noise reduction circuitry is used when a selection position P2 is selected, and both of the noise reduction circuitries are disconnected when an OFF position is selected.

As will be readily understood from FIG. 7, in any event that the signal on the tape to be reproduced has been recorded with any one of the OFF position, P1 position, or P2 position, by executing the foregoing processing operations, the selection position satisfying the condition of $\Delta L \approx \Delta H$ enclosed with a rectangle ▭ in FIG. 7 is automatically selected as an optimum position for the reproducing tape at that time.

FIG. 7 shows the example in the case where two noise reduction units are included in the noise reduction unit 3. Even if the number of noise reduction units to be included in the noise reduction circuit is higher than two, by executing the processing operation of FIG. 5, the selection position which satisfies the condition $\Delta L \approx \Delta H$ is automatically selected as an optimum position for the tape currently being played.

In apparatuses actually in use, a situation frequently occurs wherein, due to an azimuth deviation, dirt on the magnetic head or the like, the complementary relation of the frequency characteristics in the recording and reproducing operations is lost, so that the high frequency level of the reproduction signal is lower than a desired level. Even in such a case, according to the invention, the reproduction characteristic is selected so that the frequency characteristic of the reproduction signal will become a flat characteristic without a concave and convex portion. Therefore, even if the complementary relation of the frequency characteristics in the recording and reproducing operations is lost due to the azimuth deviation, dirt on the magnetic head, or the like, the selection position of the noise reduction circuitry which is considered to be the best position in the reproducing state at that time can be automatically selected.

In the foregoing example, as shown in FIG. 4, the reproduction signal is extracted from a stage after the noise reduction unit 3 and the selection position of the noise reduction circuitry is automatically judged. It is, however, also possible to add a circuit to extract the middle-to-high frequency component in the reproduction signal from a stage before the noise reduction unit 3.

In such a case, it is sufficient to use the level difference of the low frequency component $\Delta L$ detected at the stage after the noise reduction unit 3 because the level change of the low frequency component by the noise reduction operation is relatively small. The level difference of a middle to high component $\Delta H_2$ at the stage before the noise reduction unit 3 is compared with the level difference of the low frequency component $\Delta L$ at the stage after the noise reduction unit 3, and the level difference of the middle-to-high frequency component $\Delta H_1$ at the stage after the noise reduction unit 3 is compared with the level difference of the low frequency component $\Delta L$ at the stage after the noise reduction unit 3, so that an appropriate noise reduction circuitry (the selection position) is automatically judged using the results of the comparison operations as two parameters. Since the level differences are compared at the positions before and after a decoding process of the noise reduction, there is no need to switch the current selection position to the upper or lower position by one step. Thus the time period required for automatic discrimination can be further reduced.

According to the invention as mentioned above, the selection position of the noise reduction circuitry can be automatically set without using any special signal such as an ID signal or the like. In addition, since there is no need for the user to confirm and select the noise reduction circuitry, the apparatus can be extremely easily handled and there is no possibility that an inappropriate noise reduction circuitry is selected by the user.

According to the invention, further, it is possible to provide method and apparatus for automatically selecting the noise reduction circuitry which has an excellent applicability so that a tape on which recording has been performed by using a recording apparatus other than the recording circuit of the apparatus itself can also be processed without any difficulty.

What is claimed is:

1. A method of automatically selecting a noise reduction circuitry of a noise reduction system in a playback mode, said noise reduction system having a plurality of noise reduction circuitries by which middle-to-high frequency components of a low level, included in a recording signal, are compressed in dynamic range before being recorded, the compressed middle-to-high frequency components being expanded, in dynamic range, in the playback mode, thereby suppressing middle to high frequency noises in a reproduction signal, the method comprising the steps of:

obtaining a first level difference between maximum and minimum signal levels of low frequency components in the reproduction signal and a second level difference between maximum and minimum signal levels of middle-to-high frequency components in the reproduction signal only after reproduction of said recording signal starts; and shifting a selection of one of said noise reduction circuitries of said noise reduction system so that said first and second level differences are almost equal to each other while comparing magnitudes of said first and second level differences.

2. An apparatus for automatically selecting one of a plurality of noise reduction circuitries included in a noise reduction system having a recording mode and a playback mode, by which middle-to high frequency components of a low level, included in a recording signal, are compressed before being recorded, the compressed middle-to-high frequency components being expanded, in dynamic range, in the playback mode, thereby suppressing middle to high frequency noises in a reproduction signal, comprising:

low frequency signal extracting means for extracting only low frequency components from the reproduction signal only after reproduction of said recording signal starts;

middle-to-high frequency signal extracting means for extracting only middle-to-high frequency components from the reproduction signal only after reproduction of said recording signal starts;

first level detecting means for detecting a level difference between a maximum signal level and a minimum signal level of the low frequency components extracted by said low frequency signal extracting means and generating a first level difference signal;

second level detecting means for detecting a level difference between a maximum signal level and a minimum signal level of said middle-to-high frequency components extracted by said middle-to-high frequency signal extracting means and generating a second level difference signal; and noise reduction circuitry selecting means for comparing magnitudes of the first and second level difference signals which are generated by said first and second level detecting means and for shifting a selection of one of said plurality of noise reduction circuitries of said noise reduction system so that values of the first and second level difference signals become almost equal to each other.

* * * * *